United States Patent [19]

Smith

[11] Patent Number: 4,467,014

[45] Date of Patent: * Aug. 21, 1984

[54] POLYISOCYANURATE-COATED FOAM INSULATION BOARD AND METHOD OF PREPARATION

[75] Inventor: Stuart B. Smith, Conyers, Ga.

[73] Assignee: Thermocell Development, Ltd., Knoxville, Tenn.

[*] Notice: The portion of the term of this patent subsequent to Jan. 17, 2000 has been disclaimed.

[21] Appl. No.: 482,631

[22] Filed: Apr. 6, 1983

Related U.S. Application Data

[63] Continuation-in-part of Ser. No. 398,369, Jul. 14, 1982, Pat. No. 4,426,461.

[51] Int. Cl.$^3$ .................. C08G 18/14; B32B 3/26; B32B 5/18; B32B 23/00
[52] U.S. Cl. .................. 428/314.4; 521/49; 521/52; 521/57; 521/58; 521/77; 521/902; 428/319.1; 428/319.3; 428/422.8
[58] Field of Search .................. 521/49, 57, 58, 52, 521/77; 428/319.1, 319.3, 422.8, 314.4

[56] References Cited

U.S. PATENT DOCUMENTS

| | | | |
|---|---|---|---|
| 2,753,276 | 7/1956 | Brochhagen et al. | 117/72 |
| 4,024,310 | 5/1977 | Wooler et al. | 428/422.8 |
| 4,040,992 | 8/1977 | Bechara et al. | 521/902 |
| 4,071,505 | 1/1978 | Meckel et al. | 528/49 |
| 4,101,465 | 7/1978 | Lockwood et al. | 521/118 |
| 4,116,879 | 9/1978 | Bechara et al. | 252/426 |
| 4,136,240 | 1/1979 | Zimmerman et al. | 521/902 |
| 4,166,164 | 8/1979 | Cenker et al. | 521/129 |
| 4,169,921 | 10/1979 | Moss et al. | 521/125 |
| 4,177,335 | 12/1979 | Austin et al. | 521/171 |
| 4,186,255 | 1/1980 | Klein et al. | 521/128 |
| 4,189,541 | 2/1980 | Ohashi et al. | 521/110 |
| 4,204,019 | 5/1980 | Parker | 428/422.8 |
| 4,221,875 | 9/1980 | Yukuta et al. | 521/128 |
| 4,292,353 | 9/1981 | Ohashi et al. | 428/422.8 |
| 4,335,218 | 6/1982 | DeGuiseppi | 428/422.8 |
| 4,349,638 | 9/1982 | Narayan | 521/125 |
| 4,362,823 | 12/1982 | Wernsing | 521/116 |

*Primary Examiner*—H. S. Cockeram
*Attorney, Agent, or Firm*—Richard P. Crowley

[57] ABSTRACT

A polyisocyanurate coating composition, which composition comprises and is prepared by reaching 100 parts of a methylene diisocyanate, having an average functionality of less than about 2.4, with a mixture of a di or triethylene glycol and a methoxy polyethylene glycol, the reaction carried out in the presence of a trimerization catalyst, and to a polyisocyanurate-coated, rigid-foam insulation board coated with such composition.

28 Claims, No Drawings

POLYISOCYANURATE-COATED FOAM INSULATION BOARD AND METHOD OF PREPARATION

REFERENCE TO PRIOR APPLICATION

This application is a continuation-in-part of U.S. patent application Ser. No. 398,369, filed July 14, 1982 now U.S. Pat. No. 4,426,461, issued Jan. 17, 1984, hereby incorporated by reference in its entirety.

BACKGROUND OF THE INVENTION

Polyisocyanates have been reacted in the presence of a trimerization catalyst to produce polyisocyanurate foams, in an attempt to produce foams which produce a high char resistance to fire and of low smoke values. The trimerization of polyisocyanurate produces foams of superior fire performance over conventional polyurethane foams. In order to correct or mask certain undesirable properties in polyisocyanurate foams, it has been the practice to incorporate small amounts of urethane polyols in the isocyanate reaction mixture, to produce a modified urethane polyisocyanurate foam. However, the addition of such polyols often leads to degradation of the fire and smoke properties of the modified foam composition.

Polyurethane coating compositions have been prepared employing elastomeric urethanes made by reacting polyethers with toluene diisocyanate or polymeric low-functionality methylene diisocyanates. Often, these elastomeric urethanes are employed in injection-molding processes. The elastomeric coating is controlled in flexibility usually by the option of employing a higher-molecular-weight triol, with the reaction usually carried out in the presence of various types of tin catalysts. The elastomeric urethane coatings so produced are not wholly satisfactory, in that they tend to burn and melt when exposed to flame. The tensile strength of such urethane elastomeric coatings are often increased by adding various diols to the polyether triol compositions, with 1,4 butane diol being an industry standard used in increasing flexibility and tensile strength.

In the parent application, an isocyanurate thermosetting foam composition is described having improved flame, smoke and nonburning properties with high char resistance. The rigid-foam composition so prepared is suitable for use in the contruction and insulation fields, such as, for example, in forming rigid insulation panels or foam-board stock. Typically, the rigid foam composition is prepared by the reaction of 100 parts of a methylene diisocyanate having a low functionality, with or without the presence of melamine, and with a methoxy polyethylene glycol and, optionally, with a diethylene glycol, a surfactant, a trimerization catalyst and a blowing agent, typically to provide a closed-cell, thermosetting, modified isocyanurate foam having a low flame-spread value.

SUMMARY OF THE INVENTION

The invention relates to a polyisocyanurate coating composition, to substrates coated with the polyisocyanurate coating composition and to a method of preparing the polyisocyanurate coating composition and such substrates. In particular, the invention concerns a polyisocyanurate coating composition and polyisocyanurate-coated rigid-foam insulation board coated with such composition and a method of preparing the composition and the coated foam board.

It has been discovered that polyisocyanurate coating compositions, both rigid and flexible, of improved properties may be prepared from the reaction of methylene diisocyanates in the presence of a trimerization catalyst with a mixture of a di or triethylene glycol and an alkoxy polyalkylene glycol. In the invention, a polyisocyanurate coating composition, which typically is a solid of selected flexibility; that is, may be prepared as either a rigid, semirigid or flexible coating, is prepared by reacting 100 parts of a methylene diisocyanate, having an average functionality of less than about 2.4; for example, 2.0 or less, with selected amounts of a di or triethylene glycol and with selected amounts of an alkoxy polyalkylene glycol, the reaction carried out in the presence of a trimerization catalyst and generally in the absence of a urethane catalyst, or in the absence of a substantial amount of a blowing agent, to provide an improved coating composition.

The polyisocyanurate coating composition so prepared, since it may be prepared in both rigid and flexible form, is particularly useful in being sprayed or poured to produce coatings on substrates, such as to form panels or mats, for use in roofing, to prepare a washable surface, such as panels for agricultural plants, for flotation coatings on urethane or polystyrene foam, and for sealants for waterproof cement, and more particularly for forming a solid, washable coating on one surface of a rigid foam-board stock used for insulation purposes, such as, for example, polystyrene or polyisocyanurate foam-board stock. The use of the improved polyisocyanurate coating composition in the construction field is particularly applicable, because of the good fire and flame properties of the coating composition and the good adhesion and high strength of the coating composition.

The polyisocyanurate coating compositions of the invention are carried out employing, in the reaction, a methylene diisocyanate, which should not comprise the standard or conventional crude methylene phenyl diisocyanate mixture having a functionality, for example, of about 2.7 or greater, but rather it has been discovered that methylene diisocyanates (MDI) of high acid number, having a functionality of about 2.4 or less; for example, about 1.8 to 2.4, and with a minimum, for example, of 50% of a difunctional group, provide for an improved polyisocyanurate coating composition. While not wishing to be bound by any particular theory, it is believed that the higher functionality methylene diisocyanate products provide more steric hindrance which inhibits rapid cross-linking of the isocyanate, so that lower-functionality MDIs are desirable to promote more rapid cross-linking reactions. Further, the higher-functionality MDIs are believed to permit the formation of more urethane linkages. Typical methylene diisocyanates would include, but not be limited to, aromatic and dicyclic compounds, 4,4'-methylene bis (phenyl isocyanate), 4,4'-methylene bis (tolyl isocyanate), 4,4'-methylene bis (cyclohexyl isocyanate) and the like.

The invention relates to the discovery that a glycol mixture of an alkyloxypolyalkylene glycol, in combination with a di or triethylene glycol, may be reacted with a low-functionality MDI, to produce a polyisocyanurate coating which may be varied; that is, rigid or flexible, depending upon the desired mixture of the di or triethylene glycol with the capped polyalkylene glycol. The cured coating compositions have good heat stability and enhanced char resistance on ignition, by the employment of trimerization catalysts, such as a potassium catalyst like a potassium octoate, and usually in the presence of a minor amount of a urethane-type tin catalyst, such as tetravalent tin.

The polyisocyanurate coating compositions are prepared employing a mixture of glycol compounds, the ratio of which, along with other components, determines the degree of flexibility or rigidity of the cured coating composition. One of the glycol components comprises: an alkoxy polyalkylene glycol, such as a $C_1$-$C_3$ alkoxy poly $C_2$-$C_3$ alkylene glycol, particularly a methoxy polyalkylene glycol, such as a methoxy polyethylene or methoxy polypropylene glycol. Typically, such methoxy glycols have a low hydroxyl number of from about 100 or less and represent glycols where an alkoxy group, such as a methoxy group, is substituted for the hydroxyl group at the one end of the glycol. The employment of methoxy polyalkylene glycol (MPEG) often permits a reduction; for example, of 5% to 25%, of the expensive trimerization catalyst, since the MPEG is very reactive and reduces the cure time.

The alkoxy polyalkylene glycols are employed in an amount sufficient to modify the burning characteristics of the composition; that is, to increase char resistance and to provide low flame-spread and smoke values, and to prevent and inhibit melting of the coating, and in particular to permit a slightly slower cure time and a slower heat buildup which yields a smooth, pit-free coating surface. The methoxy glycol compounds are employed usually in amounts ranging up to 150 parts; for example, from about 25 to 100 parts, per 100 parts of the methylene diisocyanate used in the reaction and often from 35 to 75 parts per 100 parts MDI.

The alkoxy polyalkylene glycols useful in the invention have the structural formula:

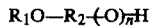

wherein $R_1$ is a lower alkyl group, such as a methyl, ethyl or propyl group, and $R_2$ is a di or trimethylene group; for example, ethylene or propylene group, and n is a number from about 3 to 20; for example, 4 to 10, with the preferred glycol being methoxy polyethylene glycol. The glycol typically is a liquid with an average molecular weight of less than about 600; for example, 275 to 550. The alkoxy polyalkylene glycols useful in the invention include, but are not limited to, methoxy polyethylene glycol, methoxy polypropylene glycol, ethoxy polypropylene glycol and mixtures and combinations thereof.

The glycol mixture employed with the MDI should include a di or a triethylene glycol of mixtures thereof in combination with the alkoxy polyalkylene glycol, to increase the impact strength and tensile strength of the coating of the composition. It has been found that higher diol compounds, such as the conventional dipropylene glycol and 1,4 butane diol, should be avoided in the coating composition of the invention, except possibly in very small amounts, since, while such higher diols tend to increase the melting point of the composition, they are low-viscosity-type materials which reduce the flow and sprayable properties of the coating composition. The di and triethylene glycols are employed in an amount ranging up to about 75 parts; for example, from about 25 to 50 parts, by weight of the di or triethylene glycol to 100 parts of the MDI, such as, for example, from 30 to 40 parts. The amount of the di and triethylene glycols used and the amount of the capped alkoxy polyalkylene glycols employed may be varied, depending upon the desired cured coating composition required, so that any combination of hard-segment and soft-segment polymer coating can create rigid, semiflexible and flexible coatings.

Optionally and if desired, polyether triols may be employed in the glycol mixture, in order to increase the impact strength of the resulting coating. The addition of triols provides higher impact strengths to the coating layer. Typically organic polyether triols which are suitable for use in preparing the coating composition of the invention would include polypropylene oxides capped with ethylene oxide and generally having a general molecular-weight range ranging from about 1000 to 6500, such as, for example, from about 1500 to 5000. The triols are employed typically by admixing the triols into the glycol mixture for reaction with the MDI. The amount of the triols to be employed in the reaction mixture may vary, depending upon the degree of impact resistance desired; however, excessive amounts of triols should be avoided, in order to avoid a diminution in fire or melt properties of the resulting coating. Typically, the amount of triols would range from 0 to 100 parts per 100 parts of MDI, and more typically from about 25 to 75 parts by weight per 100 part of MDI.

In one preferred embodiment, it has been discovered that a combination of methoxy polyethylene glycol (MPEG) and a diethylene glycol (DEG) at a ratio of about 75 to 25, when reacted with a low-functionality MDI; for example, 2.0 or less, produces a polyisocyanurate coating which is either rigid or flexible, depending on the particular ratio of materials used in the glycol mixture. Where a rigid coating layer is desired, the amount of the glycol mixture to be used may go as low as 50 parts of the glycol mixture to 100 parts of MDI. It has been found that, at ratios of 100 of mixture to 100 parts MDI, less brittle coating layers are produced with more impact resistance. However, if more elasticity; that is, impact strength, is required, the optional addition of high-molecular-weight triols to the polyethylene glycol and diethylene glycol mixture provides an increase in impace strength. It has been found that ratios of 50 parts of the triol to 50 parts of the MPEG-DEG glycol mixture can be used, without giving up substantial fire properties or reaction speeds of the coating compositions.

While not wishing to be bound by or limited to any theory of operation, it is believed that the capped polyethylene glycols employed in the reaction mixture permit the trimerization of the isocyanate groups with less steric hindrance. To provide a coating composition of superior fire performance, the di or triethylene glycol employed, or mixtures thereof, is believed to act as a coupling agent and cross-linking agent between the longer chains of the polyethers and the capped polyethylene glycol, such as the methoxy polyethylene glycol. The addition of the higher-molecular-weight methoxy polyethylene glycol to the mix appears to dilute the hydroxyl number of the di or triethylene glycol, allowing a slightly slower cure time and a slower heat buildup, which yields a better surface on the coating layer. Where excessive quantities of the di or triethylene glycol are employed, the mixture becomes too reactive, and the resulting coating composition, on curing, tends to be more crystalline in nature and unsatisfactory, while the use of too high an amount of the capped polyethylene glycol tends to provide slight bubbling and a change in color of the reaction mixture.

In the preparation of the polyisocyanurate coating compositions of the invention, one preferred embodiment employs the combination of diethylene glycol and methoxy polyethylene glycol, and, in another embodiment, includes the optional use of an ethylene oxide capped polypropylene glycol triol, with the reaction carried a trimerization catalyst of potassium, with minor amounts of tin.

The reaction is carried out also in the presence of one or more more trimerization catalysts and usually in the absence of any significant amounts of catalysts when tend to form urethane linkages; that is, in the absence of urethane catalysts. A single-stage catalyst system, and typically a single catalyst which provides a rapid and very high exotherm; for example, over 210° F.; for example, over 250° F. is desirable, in less than about 10 seconds. Such a system provides immediate trimerization, reducing urethane linkages. Suitable trimerization catalysts, for use in the preparation of the polyisocyanurate coating of the invention, comprise, but are not limited to, fatty-acid esters of alkali metals, such as potassium, such as, for example, $C_6$-$C_{12}$ fatty-acid esters like potassium octoate. Standard urethane-type catalysts which promote the formation of urethane linkages, such as the triethylene diamines or tetravalent tin catalysts, such as fatty-acid catalysts, should be used only in very minor amounts. A preferred coating composition catalyst would be the combination of a potassium trimerization catalyst and a small amount of a tetravalent tin catalyst.

The amount of the trimerization catalyst may vary, but typically ranges from 0.1 to 10 parts; for example, 0.2 to 5 parts, per 100 parts of the methylene diisocyanate. In general when used, the urethane-type tin catalyst should range from 10% to 40% of the trimerization catalyst. For example, it has been found that the catalyst system, which comprises from about 0.3 to 10 parts by weight of potassium, with 0.05 to 4 parts by weight of tetravalent tin or diethanolamine, provides a good catalyst system.

The reaction mixture optionally may contain melamine, with the amount of melamine being sufficient to provide flame retardancy, and particularly to reduce the smoke value of the composition, particularly in an amount of over 100 parts of melamine per 100 parts of the total glycol composition; for example, 125 to 200 parts per 100 parts of the glycol composition, such as 125 to 150 parts. However, the employment of excessive amounts of melamine should be avoided, in order to avoid sublimation of unreacted melamine and the production of white smoke and toxic hydrocyanic gas at high temperatures.

The reaction is carried out in the substantial absence of any blowing agent, in order to provide for a solid coating composition of desired properties. However, if desired, coating layers of very high-density foam may be prepared; that is, typically over 15 to 20 pounds per cubic foot, such as 25 to 50 pounds per cubic foot, where trace amounts of moisture or minor amounts of moisture are present in the diethylene glycol or in the catalyst system, or minor amounts of moisture are deliberately added in a controlled manner to the reaction mixture; for example, 0.1 to 0.5 parts by weight per 100 parts MDI, to provide a high-density-type foam. If desired, the reaction mixture may contain other materials and additives, such as surfactants, viscosity index improvements, diluents, flame-retardant agents, fillers, moisture-control agents, viscosity-reducing agents and various other additives.

The polyisocyanurate reaction mixture of the invention may be sprayed or poured, to produce solid, very high-density coatings on a variety of substrates, to include foams, such as rigid urethane, polystyrene or polyisocyanurate foams used as insulation, or in any other substrate, such as glass-fiber or polyester woven or nonwoven substrates to produce mats. The cured polyisocyanurate coating composition adheres well to a variety of substrates, such as metal foil like aluminum foil, wood, steel and foam, and has good fire properties, in that the coating does not melt, but rather, on exposure to open-flame and ignition chars, provides for fire-insulating properties. The degree of rigidity or flexibility can be controlled as described, and the coating composition produces a smooth, washable, surface skin.

In one method of preparation, the composition comprises the mixture of the components directly together at room temperatures; for example, 50° F. to 80° F., and the addition of the trimerization catalyst to the glycol mix and, thereafter, the addition of the MDI with mixing, to provide an exothermic curing reaction and the creation of the resulting cured product. Where the reaction mixture is applied to a surface coating or substrate, it is often desirable to preheat the substrate surface, prior to the application of the reaction mixture, particularly if a thin, cured, solid coating is to be desired on the substrate. The coating composition of the invention is particularly useful as a top-surface coating; for example, 1/16 to ⅛ of an inch, for rigid insulation-type foam; for example, polystyrene or polyisocyanurate rigid insulating foam. The aluminum foil forms one surface of the roofing-type foam, and the opposite surface is sprayed or coated with the polyisocyanurate composition of the invention, to provide a tough, washable surface which seals the top surface of the foam. The polyisocyanurate-coated foam then comprises a top layer of the cured polyisocyanurate coating, a substrate, such as a closed-cell foam layer like a rigid-foam layer, and a bottom surface of a sheet material or other substrate, and typically aluminum foil. The polyisocyanurate reaction mixture is particularly useful in spray-type applications, and may be sprayed, for example, directly on asbestos-type coatings, to seal the asbestos-containing substrate.

The invention will be described in connection with certain embodiments; however, it is recognized that various changes and modifications may be made by those persons skilled in the art, all falling within the spirit and scope of the invention.

DESCRIPTION OF THE EMBODIMENTS

EXAMPLE 1

A glycol mix was prepared as follows:

| | |
|---|---|
| 75 parts | methoxy polyethylene glycol (MPEG)-Union Carbide Co. Mol. Wt. 550 |
| 25 parts | diethylene glycol (DEG) |
| 0.4 parts | potassium octoate (PO)-trimerization catalyst |
| 0.1 parts | tetravalent tin (SN) catalyst (UL-32-Witco Chemical Co.) |

The above glycol mix was reacted in the amount of 50 parts by weight with 100 parts by weight of a methylene diisocyanate (PAPI 94 from Upjohn Company), having a functionality of 2.4. The glycol and MDI were mixed for about 5 seconds, and the reaction mixture then was poured as a top-surface coating onto the top of a rigid, insulating polyisocyanurate foam board having an aluminum foil on the opposite surface. The cure time was about 10 seconds and produced a coating layer which adhered to the foam surface, which coating layer was slightly brittle, having a smooth surface skin, and which developed a strong char on ignition.

EXAMPLE 2

Example 1 was repeated employing an MDI having a functionality of 2.0 (Mondur CD from Monsanto Company). The cure time was 8 seconds, and the coating was less brittle than the coating of Example 1.

EXAMPLE 3

Example 1 was repeated, except 100 parts of the glycol mix were reacted with the MDI. The cure time was 10 seconds, and the coating was less brittle than Example 1; however, the surface skin had some pit holes and the coating had a slight foaming tendency.

EXAMPLE 4

Example 3 was repeated employing MDI of Mondur CD of 2.0 functionality, with a cure time of 10 seconds, mixture 5 seconds. The coating was less brittle than Example 3; however, the skin surface was pitted and the coating was slightly foamed.

The lower-functionality MDI provided better results than the higher-functionality MDI. As the level of the glycol mix is increased, slight foaming occurs, as a result of slight moisture in the glycol mix and high exotherm. Moisture-scavenger agents may be added to the glycol mix to inhibit foaming.

EXAMPLE 5

To the glycol mix of Example 1 were added 25 parts of a polyether triol, molecular weight about 3000 (Olin 32-56 from Olin Corporation). Examples 1-4 were repeated using the above triol-containing glycol mix. The surface characteristics (smoothness, lack of pits, no foaming) were improved over the characteristics of Examples 1-4, while the impact strength of the cured coating layer was improved, but no change in the char strength was observed upon ignition.

EXAMPLE 6

A glycol mix was prepared as follows:

| | |
|---|---|
| 75 parts | MPEG (550 Mol. Wt.) |
| 25 parts | DEG |
| 100 parts | polyether triol - molecular weight 5000 |
| 0.8 parts | potassium octoate catalyst |
| 0.2 parts | tetravalent tin catalyst |

Examples 1-4 were repeated, with the coating surfaces being smooth and free of pits, while the surfaces demonstrated good impact resistance and retained char strength upon ignition. The cure times were fast and under 10 seconds, while adhesion of the coating to foil, wood and steel was excellent.

EXAMPLE 7

In the prior examples 1-6, the MDI (A side) was mixed with the remaining ingredients (B side), the A and B sides being equal in volume. The spray coatings industry generally has used Gusmer high pressure type mixing and spray equipment. This equipment is designed for mixing by volume, not by weight, that is, all components are pumped to the mixing chamber by equal volumes. This presents a real problem if your chemistry of polyol to isocyanate is not equal volumes.

The elasticity of the coating of the invention (e.g., the impact strength at low temperature) can be improved and the sprayed coating made hard and rubbery by increasing the polyol to isocyanate ratio.

In order to provide an equal volume spray composition, it has been found desireable to incorporate at least some of the MPEG (10-50 parts) with the parts of MDI in the A mix, with the remaining DEG and MPEG placed in the catalyzed B mix. The MPEG, but not the DEG, may be added to the A side with the MDI without a catalyst which dilutes the hydroxyl number since the MPEG has a low hydroxyl number, e.g., about 100. Thus, it has been found that the addition of sufficient MPEG to the MDI to provide an A side mixture which is equal in volume to the catalyzed B side glycol mixture, permits the easy spraying of the mixture in the industry equal-volume spray equipment. In addition, the use of high amounts of MPEG in the overall coating composition improves the coating impact strength without significant changes in the ignition and flame properties which would occur if increased amounts of a regular polyol was used.

A coating composition of A and B mix sprayed from Gusmer spray equipment in equal volume was prepared as set below:

A side mix:
  70 parts isocyanate CD
  30 parts M-Peg
  Mixed with no catalyst present
B side mix:
  25 parts DEG
  75 parts M-Peg
  0.4 parts Potassium Octoate-catalyst
  0.1 parts Tetravalent Tin-catalyst
  0.4 parts Diethanolamine (DEOA)
Results:
  Cure time 10 seconds. Product very rubbery in nature, with high tensile strength, particularly at 0° C. Slightly less curing on ignition. No spraying or adhesion problems.

The coating composition of example 7 was sprayed on rigid commercial foam roofing boards to form a rubbery protective coating. If desired, it is recognized that other coatings can be used—such as sprayed on top of the coating composition of the invention to enhance to weatherability of the polyisocyanate coatings. Typical materials for use in such other coating layer include, but are not limited to, acrylic resins, silicones, water glass, and similar materials.

What is claimed is:

1. A polyisocyanurate coating composition, which composition is prepared by reacting 100 parts by weight of a methylene diisocyanate, having an average functionality of less than about 2.4, with from about 25 to 50 parts by weight of a di or triethylene glycol, and with from about 25 to 150 parts by weight of a $C_1$-$C_3$ alkoxy poly $C_2$-$C_3$ alkylene glycol, the reaction carried out in the presence of a trimerization catalyst and in the substantial absence of a blowing agent.

2. The coating composition of claim 1 wherein the methylene diisocyanate has an average functionality of from about 1.7 to 2.4.

3. The coating composition of claim 1 wherein the alkylene glycol comprises a methoxy polyethylene glycol.

4. The coating composition of claim 3 wherein the methoxy polyethylene glycol has an average molecular weight of from about 275 to 600.

5. The coating composition of claim 1 wherein the di or tri glycol and the alkoxy polyalkylene glycol are present in a ratio of from about 75 to 100 parts by weight of the alkoxy polyalkylene glycol to about 25 parts by weight of the di or triethylene glycol.

6. The coating composition of claim 5 wherein the di or triethylene glycol comprises diethylene glycol and the alkoxy polyalkylene glycol comprises methoxy polyethylene glycol.

7. The coating composition of claim 1 wherein the trimerization catalyst comprises a potassium salt.

8. The coating composition of claim 7 wherein the trimerization catalyst consists essentially of potassium octoate.

9. The coating of claim 7 which includes a tetravalent tin catalyst or diethanolamine.

10. The coating composition of claim 1 which includes reacting with the methylene diisocyanate up to about 100 parts by weight of a polyether triol having a molecular weight ranging from about 1000 to 6500.

11. The coating composition of claim 1 wherein the polyether triol comprises an ethylene oxide capped polypropylene oxide.

12. The coating composition of claim 11 wherein the ethylene oxide capped polypropylene oxide triol ranges in an amount of from about 25 to 75 parts by weight.

13. The coating composition of claim 1 which includes a small amount of water, to provide a foam-coating composition having a density greater than about 20 pounds per cubic foot.

14. The coating composition of claim 1 wherein the ratio of the di or triethylene glycol to the alkoxy polyalkylene glycol is about 50 parts by weight of a diethylene glycol to about 50 parts by weight of a methoxy polyethylene glycol.

15. The cured composition of claim 1.

16. A substrate material which contains thereon a coating layer formed from the coating composition of claim 1.

17. A substrate material which comprises a rigid foam material and contains thereon a coating layer formed from the coating composition of claim 1.

18. A substrate material which comprises a rigid-board insulating foam composition which contains, on one surface thereof, a solid coating layer of the composition of claim 1.

19. A substrate material which comprises a rigid, polyisocyanurate, insulating foam board having one surface coated with a solid coating layer of the coating composition of claim 1.

20. A coated, rigid, insulating, foam-board article which comprises a rigid, insulating, substantially closed-cell foam-board composition suitable for use for insulating purposes, a thin aluminum-foil material bonded to one surface of the foam composition, and a solid coating layer of the polyisocyanurate coating composition of claim 1 on the opposite surface of the foam composition.

21. A polyisocyanurate coating composition, which composition is prepared by reacting 100 parts by weight of a methylene diisocyanate, having an average functionality of from about 1.7 to 2.4, with from about 25 to 75 parts by weight of diethylene glycol, and from about 25 to 75 parts by weight of a methoxy polyethylene glycol, the reaction carried out in the presence of a catalytic amount of a potassium trimerization catalyst and in the absence of a blowing agent.

22. The coating composition of claim 21 which includes from about 25 to 75 parts by weight of an ethylene oxide capped polypropylene oxide triol having a molecular weight of from about 1000 to 6500.

23. The coating composition of claim 21 wherein the catalyst comprises potassium octoate, with from about 0.05 to 4 parts per 100 parts of the methylene diisocyanate of a tetravalent tin catalyst.

24. The cured, solid, polyisocyanurate coating composition of claim 21.

25. The coating composition of claim 1 which is prepared by including a first step of reacting a first mixture of 10 to 40 parts by weight of methoxy ethylene glycol and 100 parts by weight of the methylene diisocyanate and, thereafter, with a second mixture containing methoxy ethylene glycol, diethylene glycol and the trimerization catalyst.

26. The coating composition of claim 1 which comprises generally equal volumes of a first mixture composition of methylene diisocyanate and $C_1$-$C_3$ alkoxy poly $C_2$-$C_3$ alkylene glycol and a second mixture composition comprising diethylene or triethylene glycol and the trimerization catalyst.

27. The coating composition of claim 26 wherein the $C_1$-$C_3$ alkoxy poly $C_2$-$C_3$ alkylene glycol is present in both the first and second mixture compositions.

28. The coating composition of claim 26 wherein the first mixture composition comprises a methylene diisocyanate having an average functionality of about 1.7 to 2.4 and methoxy polyethylene glycol and the second mixture composition comprises methoxy polyethylene glycol, diethylene or triethylene glycol, and a potassium and a tetravalent tin trimerization catalyst.

* * * * *